United States Patent [19]
Guillon

[11] Patent Number: 5,511,343
[45] Date of Patent: Apr. 30, 1996

[54] SEALING DEVICE INCLUDING A TUBULAR SECTION ELEMENT IN PARTICULAR FOR A MOTOR VEHICLE

[75] Inventor: Henri Guillon, Le Bois Saint-Maurice-sur-Fessard, France

[73] Assignee: Hutchinson, Paris, France

[21] Appl. No.: 295,638

[22] PCT Filed: Mar. 8, 1993

[86] PCT No.: PCT/FR93/00225

§ 371 Date: Aug. 26, 1994

§ 102(e) Date: Aug. 26, 1994

[87] PCT Pub. No.: WO93/17888

PCT Pub. Date: Sep. 16, 1993

[30] Foreign Application Priority Data

Mar. 10, 1992 [FR] France ................................ 92 02836

[51] Int. Cl.⁶ ........................................... E06B 7/16
[52] U.S. Cl. ................ 49/479.1; 49/475.1; 49/498.1
[58] Field of Search ........................ 49/475.1, 479.1, 49/482.1, 490.1, 498.1

[56] References Cited

U.S. PATENT DOCUMENTS

| | | | |
|---|---|---|---|
| 2,702,416 | 2/1955 | Bright | 49/498.1 X |
| 2,794,221 | 6/1957 | Bedics | 49/479.1 |
| 3,159,886 | 12/1964 | Lynch | 49/479.1 |
| 3,165,793 | 1/1965 | Lynch | 49/479.1 |
| 4,448,430 | 5/1984 | Bright | 49/498.1 X |
| 4,769,947 | 9/1988 | Ogawa | |
| 4,884,370 | 12/1989 | Nozaki et al. | 49/479.1 |
| 4,928,431 | 5/1990 | Kuzuhara et al. | 49/479.1 |
| 5,258,157 | 11/1993 | Nozaki et al. | 49/479.1 X |

FOREIGN PATENT DOCUMENTS

| | | |
|---|---|---|
| 2492939 | 4/1982 | France . |
| 2624191 | 6/1989 | France . |
| 2642809 | 8/1990 | France . |
| 2669279 | 5/1992 | France . |
| 3336733 | 4/1985 | Germany . |

OTHER PUBLICATIONS

Patent Abstracts of Japan, JP 62–283034, Dec. 8, 1987 entitled *Sealing Device for Automobile*, vol. 12, No. 169 (M–699) (3016), May 20, 1988.

*Primary Examiner*—Brian K. Green
*Assistant Examiner*—Jerry Redman
*Attorney, Agent, or Firm*—Bell, Seltzer, Park & Gibson

[57] ABSTRACT

A sealing device comprising a fixing element (11) for fixing it to a support (T), in particular the framework or the bodywork of a motor vehicle, and a tubular section element (12) with which a moving portion of the vehicle such as a door, an engine hood, or a trunk cover of the vehicle is suitable for cooperating in sealed manner. The tubular section element (12) is disconnected from the fixing element (11) in predetermined discrete zones (31, 32), which are preferably the zones in which the device closely fits curved portions of the support on which it is designed to be mounted by means of its fixing element.

4 Claims, 1 Drawing Sheet

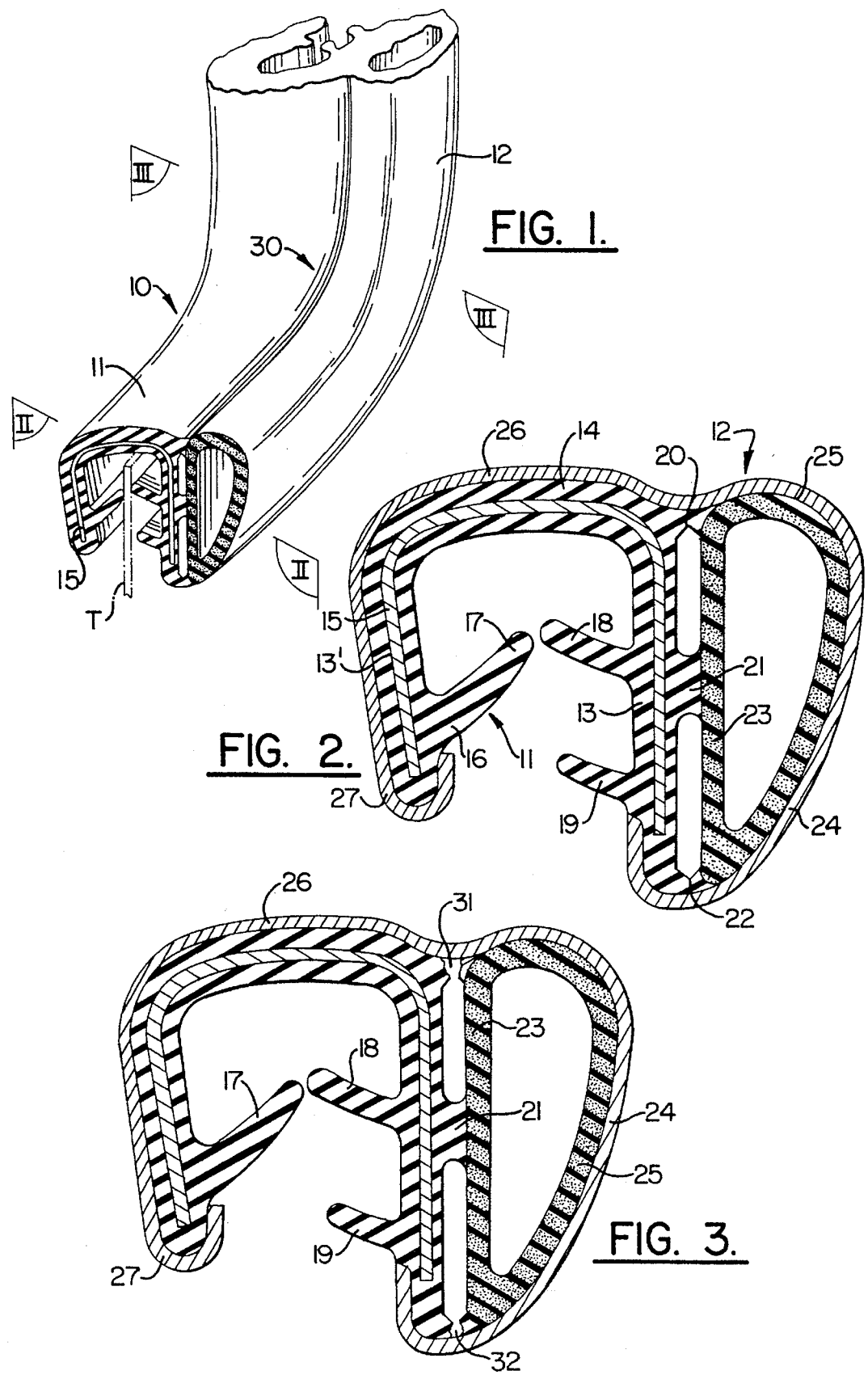

SEALING DEVICE INCLUDING A TUBULAR SECTION ELEMENT IN PARTICULAR FOR A MOTOR VEHICLE

BACKGROUND OF THE INVENTION

1. Field of the Invention

The invention relates to tubular section element sealing devices, in particular for motor vehicles.

It relates in particular to a sealing device comprising an element for fixing to the framework or bodywork of a motor vehicle and a tubular section element suitable for co-operating with a moving portion of the vehicle such as a door, an engine hood, or a trunk cover, etc.

2. Description of the Prior Art

Such sealing devices have been known for a long time and in numerous embodiments, e.g. from FR-A-2 257 008, FR-A-2 492 939, FR-A-2 624 191, or FR-A-2 642 809. The latter document in particular explains the conditions that need to be satisfied by a sealing device so that when mounted on all or part of the perimeter of an opening in a motor vehicle body, it follows closely the shapes of its support while satisfying various functional requirements such as pleasing appearance, proper fitting together, etc., which requirements are not always satisfied, particularly when the device is deformed locally, which can give rise to folds, waves, superficial curling, etc.

Although, as also mentioned in FR-A-2 642 809, such drawbacks can compromise sealing and the ease with which a door or the like co-operating with the device can be closed, they are in addition particularly troublesome for applications where the tubular section element is lined with a textile lining such as velvet, since it is unacceptable for such a lining to be non-uniform in appearance when fitted to expensive vehicles in which they are used specifically for the purpose of imparting an appearance of exceptional quality.

SUMMARY OF THE INVENTION

Solutions already proposed for reducing such drawbacks, including those in the cited documents, are not entirely satisfactory insofar as they provide for a visible portion of the tubular section element to be cut out, or for a portion of the section of the tubular element to be replaced by an add-on element made of compact elastomer, and consequently, a general aim of the present invention is to provide a sealing device that mitigates the drawbacks of known devices.

Another aim of the invention is to provide such a device which is particularly simple to implement, even on elements of bodywork having a profile that includes portions of small radius of curvature.

According to the invention, a sealing device comprising a fixing element for fixing it to a support, in particular the framework or the bodywork of a motor vehicle, and a tubular section element with which a moving portion of the vehicle such as a door, an engine hood, a trunk cover, or the like of the vehicle is suitable for co-operating in sealed manner, is characterized in that the tubular section element is disconnected from the fixing element in predetermined discrete zones.

According to another characteristic of the invention, said predetermined zones are zones in which the device closely follows curved portions of the support on which it is designed to be fixed by means of its fixing element.

Also according to the invention, said predetermined zones are the result of the tubular section element and of bridging strips that interconnect the fixing elements being cut in discrete zones.

According to another characteristic of the invention, the tubular section element at least is lined on its outside face with lining such as a velvet or the like.

The invention will be well understood from the following description given by way of example and made with reference to the accompanying drawing, in which:

BRIEF DESCRIPTION OF THE DRAWINGS

FIG. 1 is a diagrammatic perspective view of a sealing device of the invention;

FIG. 2 is a section view on plane II—II of FIG. 1, an larger scale; and

FIG. 3 is a section view on plane III—III of FIG. 1, and likewise on a larger scale.

DESCRIPTION OF THE PREFERRED EMBODIMENTS

In FIG. 1, a sealing device 10 of the invention comprises an element or clamp 11 of II-shaped right cross-section for fixing on the sheetmetal of the framework or bodywork of a motor vehicle, together with a tubular sealing element 12. The fixing element 11 (which includes in conventional manner reinforcement 15 embedded in a matrix 16 of elastomer or plastomer material that provides flanges 13, 13' and a web 14) is also provided on its inside faces with lips 17, 18, and 19 for holding the device on the sheetmetal 10 and which are, likewise in known manner, made of the same material or of a material that is different from that which forms the matrix 16, the assembly generally being manufactured by extruding or coextruding the material(s) constituting the clamp onto the reinforcement 15. It is likewise during this manufacturing process that the tubular section element 12 is obtained, which is advantageously made of a cellular material and which is connected to the clamp 11 along bridging strips such as 20, 21, and 22 that project substantially from the ends and from the middle of the flange 13 and of the facing face 23 of the tubular section element 12.

In the embodiment described and shown, the outside surface of the device is provided with a textile coating 24 of the velvet type or the like, which coating extends over the outside face 24 of the tubular section element 12, over the web 14 interconnecting the flanges 13 and 13' where it constitutes coating 26, and over the outside face of the flange 13' where it constitutes coating 27.

When such a sealing device is shaped as shown in FIG. 1, i.e. with at least one curved portion 30, use of the bridging strips 20–22 to connect the tubular element 12 to the clamp 11 does not permit satisfactory curving, and as a result, in order to achieve such curving the invention proposes disconnecting the tubular element 12 from the clamp 11 by locally interrupting (i.e. by cutting in discrete zones) the bridging strips 20 and 22 as shown at 31 and 32 in FIG. 3, thereby causing the tubular element 12 to "float" relative to the clamp 11 in said zones where cutting has taken place.

By cutting the link between the tubular element 12 and the clamp 11 in discrete zones only, it is possible to apply the textile lining of velvet or the like over the entire length of the tubular element 12 and over a portion of the clamp 16 by means of adhesive without giving rise to undulations that spoil the appearance of the product and as necessarily occur when the tubular element 12 is disconnected so as to "float" relative to the clamp 11 over the entire length of said element and of said clamp.

The device of the invention thus makes assembly simple and satisfactory with respect to the appearance of a velvet-coated sealing gasket on expensive cars where such gaskets are used to contribute to the luxury image and to the particularly careful finish.

I claim:

1. A sealing device comprising a fixing element for fixing the sealing device to a support in a motor vehicle and a tubular element for cooperating in a sealed manner with a moving portion of the motor vehicle, said tubular element extending along a side wall of the fixing element and being connected to said side wall by longitudinal bridging strips provided substantially at opposite ends and in the middle of said side wall, said bridging strips provided at the opposite ends of the side wall being interrupted in discrete zones to facilitate forming the sealing device into a curved shape.

2. A device according to claim 1, wherein the tubular element is provided with an outer textile lining.

3. A device according to claim 2, wherein the tubular element is made of a cellular material.

4. A device according to claim 1, wherein the tubular element is made of a cellular material.

* * * * *